(12) United States Patent
Brooks

(10) Patent No.: US 6,452,767 B1
(45) Date of Patent: Sep. 17, 2002

(54) ARCING FAULT DETECTION SYSTEM FOR A SECONDARY LINE OF A CURRENT TRANSFORMER

(75) Inventor: Stanley J. Brooks, Rockvale, TN (US)

(73) Assignee: Square D Company, Palatine, IL (US)

( * ) Notice: Subject to any disclaimer, the term of this patent is extended or adjusted under 35 U.S.C. 154(b) by 755 days.

(21) Appl. No.: 08/789,659

(22) Filed: Jan. 27, 1997

Related U.S. Application Data

(63) Continuation-in-part of application No. 08/403,033, filed on Mar. 13, 1995, now abandoned.

(51) Int. Cl.⁷ .............................................. H02H 3/00
(52) U.S. Cl. ...................................................... 361/42
(58) Field of Search ............................... 361/42, 46–50, 361/65, 76, 78, 79, 80, 86–89, 93, 94; 324/76.41–76.45, 520–522, 541, 544

(56) References Cited

U.S. PATENT DOCUMENTS

| | | | |
|---|---|---|---|
| 2,808,566 A | 10/1957 | Douma | 324/127 |
| 2,832,642 A | 4/1958 | Lennox | 299/132 |
| 2,898,420 A | 8/1959 | Kuze | 200/87 |

(List continued on next page.)

FOREIGN PATENT DOCUMENTS

| | | | |
|---|---|---|---|
| EP | 0 094 871 A1 | 5/1983 | H02H/1/00 |
| EP | 0 615 327 | 9/1994 | H02H/1/00 |
| EP | 0 649 207 A1 | 4/1995 | H02H/3/04 |
| EP | 0 748 021 A1 | 12/1996 | H02H/1/00 |
| EP | 0 762 591 A2 | 3/1997 | H02H/3/33 |
| EP | 0 802 602 A2 | 10/1997 | H02H/1/00 |
| EP | 0813281 | 12/1997 | |
| GB | 2 177 561 A | 6/1985 | H02H/3/00 |
| GB | 2285886 A | 7/1995 | H01H/71/74 |
| WO | WO 97/30501 | 8/1997 | H02H/1/00 |

OTHER PUBLICATIONS

Antonio N. Paolantonio, P.E., Directional Couplers, R.F. Design, Sep./Oct., 1979, pp. 40–49.

Alejandro Duenas, J., Directional Coupler Design Graphs For Parallel Coupled Lines and Interdigitated 3 dB Couplers, RF Design, Feb., 1986, pp. 62–64.

RV4145 Low Power Ground Fault Interrupter, Preliminary Product Specifications of Integrated Circuits, Raytheon Company Semiconductor Division, 350 Ellis Street, Mountain View CA 94309–7016, pp. 1–8. No Date.

Jean–Francois Joubert, Feasibility of Main Service Ground–Fault Protection On The Electrical Service To Dwelling Units, Consultants Electro–Protection Ins., 1980, Michelin St., Laval, Quebec H71 9Z7. Oct. 26, 1990, pp. 1–77.

B.D. Russell, Dectection Of Arcing Faults On Distribution Feeders, Texas A & M Research Foundation, Box H. College Station, Texas 77843, Final Report Dec., 1982, pp. 1–B18.

*Primary Examiner*—Ronald W. Leja
(74) *Attorney, Agent, or Firm*—Kareem M. Irfan; Larry I. Golden

(57) ABSTRACT

A method and apparatus for detecting arcing faults in an electrical distribution system including a plurality of phase lines for connecting a power source to a respective plurality of loads and one or more current transformers electrically coupled to a selected number of the phase lines. Each of the current transformers have a secondary line extending therefrom and carry an electrical current. The arcing fault detection system comprises a sensor coupled to at least one of the secondary lines for monitoring the rate-of-change of current or voltage associated with the secondary line and producing a signal representing the rate-of-change. An arcing fault detector circuit evaluates the sensor signal for characteristics representative of arcing faults. If an arcing fault is detected, the arcing fault detector circuit triggers a line interrupter to disconnect the load from the power source in the phase line associated with the secondary line.

11 Claims, 8 Drawing Sheets

U.S. PATENT DOCUMENTS

| | | | |
|---|---|---|---|
| 3,471,784 A | 10/1969 | Arndt et al. | 324/126 |
| 3,538,241 A | 11/1970 | Rein | 174/143 |
| 3,588,611 A | 6/1971 | Lambden et al. | 317/31 |
| 3,600,502 A | 8/1971 | Wagenaar et al. | 174/143 |
| 3,622,872 A | 11/1971 | Boaz et al. | 324/52 |
| 3,684,955 A | 8/1972 | Adams | 324/72 |
| 3,746,930 A | 7/1973 | Van Best et al. | 317/31 |
| 3,775,675 A | 11/1973 | Freeze et al. | 324/51 |
| 3,812,337 A | 5/1974 | Crosley | 235/153 AC |
| 3,858,130 A | 12/1974 | Misencik | 335/18 |
| 3,869,665 A | 3/1975 | Kenmochi et al. | 324/72 |
| 3,878,460 A | 4/1975 | Nimmersjo | 324/52 |
| 3,911,323 A | 10/1975 | Wilson et al. | 317/18 |
| 3,914,667 A | 10/1975 | Waldron | 317/36 |
| 3,932,790 A | 1/1976 | Muchnick | 317/18 D |
| 3,939,410 A | 2/1976 | Bitsch et al. | 324/72 |
| 4,052,751 A | 10/1977 | Shepard | 361/50 |
| 4,074,193 A | 2/1978 | Kohler | 324/126 |
| 4,081,852 A | 3/1978 | Coley et al. | 361/45 |
| 4,087,744 A | 5/1978 | Olsen | 324/51 |
| 4,156,846 A | 5/1979 | Harrold et al. | 324/158 |
| 4,169,260 A | 9/1979 | Bayer | 340/562 |
| 4,214,210 A | 7/1980 | O'Shea | 455/282 |
| 4,233,640 A * | 11/1980 | Klein et al. | 361/44 |
| 4,245,187 A | 1/1981 | Wagner et al. | 324/54 |
| 4,251,846 A | 2/1981 | Pearson et al. | 361/30 |
| 4,264,856 A | 4/1981 | Frierdich et al. | 322/25 |
| RE30,678 E | 7/1981 | Van Zeeland et al. | 361/44 |
| 4,316,187 A | 2/1982 | Spencer | 340/664 |
| 4,354,154 A | 10/1982 | Olsen | 324/51 |
| 4,356,443 A | 10/1982 | Emery | 324/51 |
| 4,387,336 A | 6/1983 | Joy et al. | 324/51 |
| 4,459,576 A | 7/1984 | Fox et al. | 336/84 |
| 4,466,071 A | 8/1984 | Russell, Jr. | 364/492 |
| 4,616,200 A | 10/1986 | Fixemer et al. | 335/35 |
| 4,639,817 A | 1/1987 | Cooper et al. | 361/62 |
| 4,642,733 A | 2/1987 | Schacht | 361/118 |
| 4,644,439 A | 2/1987 | Taarning | 361/87 |
| 4,652,867 A | 3/1987 | Masot | 340/638 |
| 4,658,322 A | 4/1987 | Rivera | 361/37 |
| 4,697,218 A | 9/1987 | Nicolas | 633/882 |
| 4,702,002 A | 10/1987 | Morris et al. | 29/837 |
| 4,707,759 A | 11/1987 | Bodkin | 831/642 |
| 4,771,355 A | 9/1988 | Emery et al. | 361/33 |
| H536 H | 10/1988 | Strickland et al. | 324/456 |
| H538 H | 11/1988 | Betzold | 89/134 |
| 4,810,954 A | 3/1989 | Fam | 324/142 |
| 4,833,564 A | 5/1989 | Pardue et al. | 361/93 |
| 4,835,648 A | 5/1989 | Yamauchi | 361/14 |
| 4,845,580 A | 7/1989 | Kitchens | 361/91 |
| 4,853,818 A | 8/1989 | Emery et al. | 361/33 |
| 4,858,054 A | 8/1989 | Franklin | 361/57 |
| 4,866,560 A | 9/1989 | Allina | 361/104 |
| 4,882,682 A | 11/1989 | Takasuka et al. | 364/507 |
| 4,893,102 A | 1/1990 | Bauer | 335/132 |
| 4,901,183 A | 2/1990 | Lee | 361/56 |
| 4,922,368 A | 5/1990 | Johns | 361/62 |
| 4,931,894 A | 6/1990 | Legatti | 361/45 |
| 4,939,495 A | 7/1990 | Peterson et al. | 337/79 |
| 4,949,214 A | 8/1990 | Spencer | 361/95 |
| 4,969,063 A | 11/1990 | Scott et al. | 361/93 |
| 5,047,724 A | 9/1991 | Boksiner et al. | 324/520 |
| 5,051,731 A | 9/1991 | Guim et al. | 340/638 |
| 5,121,282 A | 6/1992 | White | 361/42 |
| 5,166,861 A | 11/1992 | Krom | 361/379 |
| 5,168,261 A | 12/1992 | Weeks | 340/515 |
| 5,179,491 A | 1/1993 | Runyan | 361/45 |
| 5,185,684 A | 2/1993 | Beihoff et al. | 361/45 |
| 5,185,685 A | 2/1993 | Tennies et al. | 361/45 |
| 5,185,686 A | 2/1993 | Hansen et al. | 361/45 |
| 5,185,687 A | 2/1993 | Beihoff et al. | 361/45 |
| 5,206,596 A | 4/1993 | Beihoff et al. | 324/536 |
| 5,208,542 A | 5/1993 | Tennies et al. | 324/544 |
| 5,223,795 A | 6/1993 | Blades | 324/536 |
| 5,224,006 A | 6/1993 | MacKenzie et al. | 361/45 |
| 5,257,157 A | 10/1993 | Epstein | 361/111 |
| 5,280,404 A | 1/1994 | Ragsdale | 361/113 |
| 5,286,933 A | 2/1994 | Pham | 324/460 |
| 5,307,230 A | 4/1994 | MacKenzie | 361/96 |
| 5,334,939 A | 8/1994 | Yarbrough | 324/424 |
| 5,353,014 A | 10/1994 | Carroll et al. | 340/638 |
| 5,359,293 A | 10/1994 | Boksiner et al. | 324/544 |
| 5,363,269 A | 11/1994 | McDonald | 361/45 |
| 5,383,084 A | 1/1995 | Gershen et al. | 361/113 |
| 5,388,021 A | 2/1995 | Stahl | 361/56 |
| 5,396,179 A | 3/1995 | Domenichini et al. | 324/546 |
| 5,412,526 A | 5/1995 | Kapp et al. | 361/56 |
| 5,412,590 A | 5/1995 | Tajali | 361/669 |
| 5,420,740 A | 5/1995 | MacKenzie et al. | 361/45 |
| 5,424,894 A * | 6/1995 | Briscall et al. | 361/45 |
| 5,434,509 A | 7/1995 | Blades | 324/536 |
| 5,444,424 A | 8/1995 | Wong et al. | 335/172 |
| 5,446,431 A | 8/1995 | Leach et al. | 335/18 |
| 5,448,443 A | 9/1995 | Muelleman | 361/111 |
| 5,452,223 A | 9/1995 | Zuercher et al. | 364/483 |
| 5,459,630 A | 10/1995 | MacKenzie et al. | 361/45 |
| 5,477,150 A | 12/1995 | Ham, Jr. et al. | 324/536 |
| 5,481,235 A | 1/1996 | Heise et al. | 335/18 |
| 5,483,211 A | 1/1996 | Carrodus et al. | 335/18 |
| 5,485,093 A | 1/1996 | Russell et al. | 324/522 |
| 5,493,278 A | 2/1996 | MacKenzie et al. | 340/638 |
| 5,506,789 A | 4/1996 | Russell et al. | 364/492 |
| 5,510,946 A | 4/1996 | Franklin | 361/56 |
| 5,512,832 A | 4/1996 | Russell et al. | 324/522 |
| 5,519,561 A | 5/1996 | Mrenna et al. | 361/105 |
| 5,546,266 A | 8/1996 | Mackenzie et al. | 364/93 |
| 5,561,605 A | 10/1996 | Zuercher et al. | 364/483 |
| 5,568,371 A | 10/1996 | Pitel et al. | 363/39 |
| 5,578,931 A | 11/1996 | Russell et al. | 324/536 |
| 5,590,012 A | 12/1996 | Dollar | 361/113 |
| 5,602,709 A | 2/1997 | Al-Dabbagh | 361/85 |
| 5,608,328 A | 3/1997 | Sanderson | 324/529 |
| 5,657,244 A | 8/1997 | Seitz | 364/492 |
| 5,659,453 A | 8/1997 | Russell et al. | 361/93 |
| 5,682,101 A | 10/1997 | Brooks et al. | 324/536 |
| 5,691,869 A | 11/1997 | Engel et al. | 361/42 |
| 5,701,110 A | 12/1997 | Scheel et al. | 335/132 |
| 5,706,154 A | 1/1998 | Seymour | 361/42 |
| 5,729,145 A | 3/1998 | Blades | 324/536 |
| 5,805,397 A | 9/1998 | MacKenzie | 361/42 |
| 5,805,398 A | 9/1998 | Rae | 361/42 |
| 5,815,352 A | 9/1998 | Mackenzie | 361/42 |
| 5,818,237 A | 10/1998 | Zuercher et al. | 324/536 |
| 5,818,671 A | 10/1998 | Seymour et al. | 361/42 |
| 5,835,319 A | 11/1998 | Welles, II et al. | 361/5 |
| 5,835,321 A | 11/1998 | Elms et al. | 361/45 |
| 6,160,697 A * | 3/2000 | Edel | 361/143 |

* cited by examiner

ARCING FAULT DETECTION SYSTEM FOR A SECONDARY LINE OF A CURRENT TRANSFORMER

CROSS REFERENCE TO RELATED APPLICATIONS

This application is a continuation-in-part of pending U.S. patent application Ser. No. 08/403,033, filed Mar. 13, 1995 now abandoned and entitled "Current Sensing Arcing Fault Detector and Method". The parent application has the same assignee as the present invention and is incorporated herein by reference in its entirety.

FIELD OF THE INVENTION

The present invention relates generally to circuit protection devices in electrical distribution systems and, more particularly, to an arcing fault detection system connected to a secondary line of a current transformer in an industrial electrical distribution system.

BACKGROUND OF THE INVENTION

Electrical systems in residential, commercial and industrial applications usually include a panelboard or load center for receiving electrical power from a utility source. Depending on the application, either of several types of panelboards may be used. For instance, one common type of panelboard is a one phase, three wire system adapted to receive power from the utility source via two line bus bars and neutral bus bars. Another common type of panelboard, typically used in industrial applications, is a three phase, four wire system adapted to receive power from the utility source via three phase bus bars and a neutral bus. The electrical power is delivered from the panelboard to designated branch circuits through line and neutral conductors supplying one or more loads. The line conductors are electrically connected to the line or phase buses and the neutral conductors are electrically connected to the neutral bus.

Typically, various types of protective devices are either mounted to the bus bars of the panelboard or connected to the line and/or neutral conductors of designated branch circuits to protect the electrical distribution system from hazardous electrical conditions and reduce the risk of injury, damage or fires. An arcing fault detector is one type of protective device that may be utilized to protect the electrical distribution system from arcing faults, which occur when electric current "arcs" or flows through ionized gas between two ends of a broken conductor, between two conductors supplying a load, or between a conductor and ground. Arcing faults typically result from corroded, worn or aged wiring or insulation, loose connections, wiring damaged by nails or staples through the insulation, or electrical stress caused by repeated overloading, lightning strikes, etc. The presence of an arcing fault creates a significant fire hazard because it generates heat which may ignite the conductor insulation and adjacent combustible materials.

There are several systems known in the art for detecting arcing faults. Generally, these systems utilize a sensing coil around the line conductor of a branch circuit for sensing characteristics of current flowing in the line conductor, then process the information to determine whether the sensed data represents the occurrence of an arcing fault. If an arcing fault is detected, the branch circuit is "tripped" open to stop current from flowing in the branch circuit. Alternatively, the arcing fault detection system may sense line voltage rather than line current.

The sensing coil may be electrically coupled to the line conductor in any of several ways known in the art. For instance, the sensing coil may be incorporated within a standard circuit breaker which is mounted to the line or phase bus in a panelboard. The tripping mechanism associated with the circuit breaker may then be used to interrupt the electrical circuit in response to arcing faults as well as overloads, short circuits and/or ground faults. Sensing coils may also be coupled directly to the line bus, phase bus or line conductor of a designated branch circuit, or may be contained within separate arcing fault detector modules connected to the line conductors of designated branch circuits.

In industrial applications, the line or phase bus bars are generally very large in order to accommodate very high levels of current. Typically, current transformers are coupled to the line or phase bus bars in order to step down the current and to enable monitoring equipment to be connected to the system. The line or phase bus bars, which may be up to about eight inches in diameter, may carry a current from 50 amps to 6,000 amps. The output, or secondary, of the current transformers typically comprise standard 16 gauge electrical wires and carry a standard current of 5 amps. To add an arcing fault detection capability to the system in the manner known in the prior art, the bus bar must be dismantled in order to place an arcing fault sensor around the bus bar. The cost of dismantling the bus bar and providing a sensor large enough to encircle the bus bar can be prohibitive.

The present invention is directed to an arcing fault detection system adapted for industrial applications which may be installed much less expensively than prior art systems.

SUMMARY OF THE INVENTION

In accordance with one aspect of the present invention, there is provided a system for detecting arcing faults in an electrical distribution system including a plurality of phase lines for connecting a power source to a respective plurality of loads, and a current transformer electrically coupled to one of the phase lines. The current transformer has a secondary line extending therefrom carrying an electrical current. The system monitors the secondary line for the occurrence of an arcing fault in the corresponding phase line and disconnects the load from the power source in response to the detection of an arcing fault in the corresponding phase line. The monitoring of the secondary line for the occurrence of an arcing fault comprises monitoring changes in current (or voltage) associated with the secondary line and producing a rate-of-change signal representing the rate of change of current (or voltage) associated with the secondary line. An arc-fault-detection signal is generated in response to variations in the rate-of-change signal representing an arcing fault.

BRIEF DESCRIPTION OF THE DRAWINGs

In the drawings, which comprise a portion of this disclosure.

Figure 1:
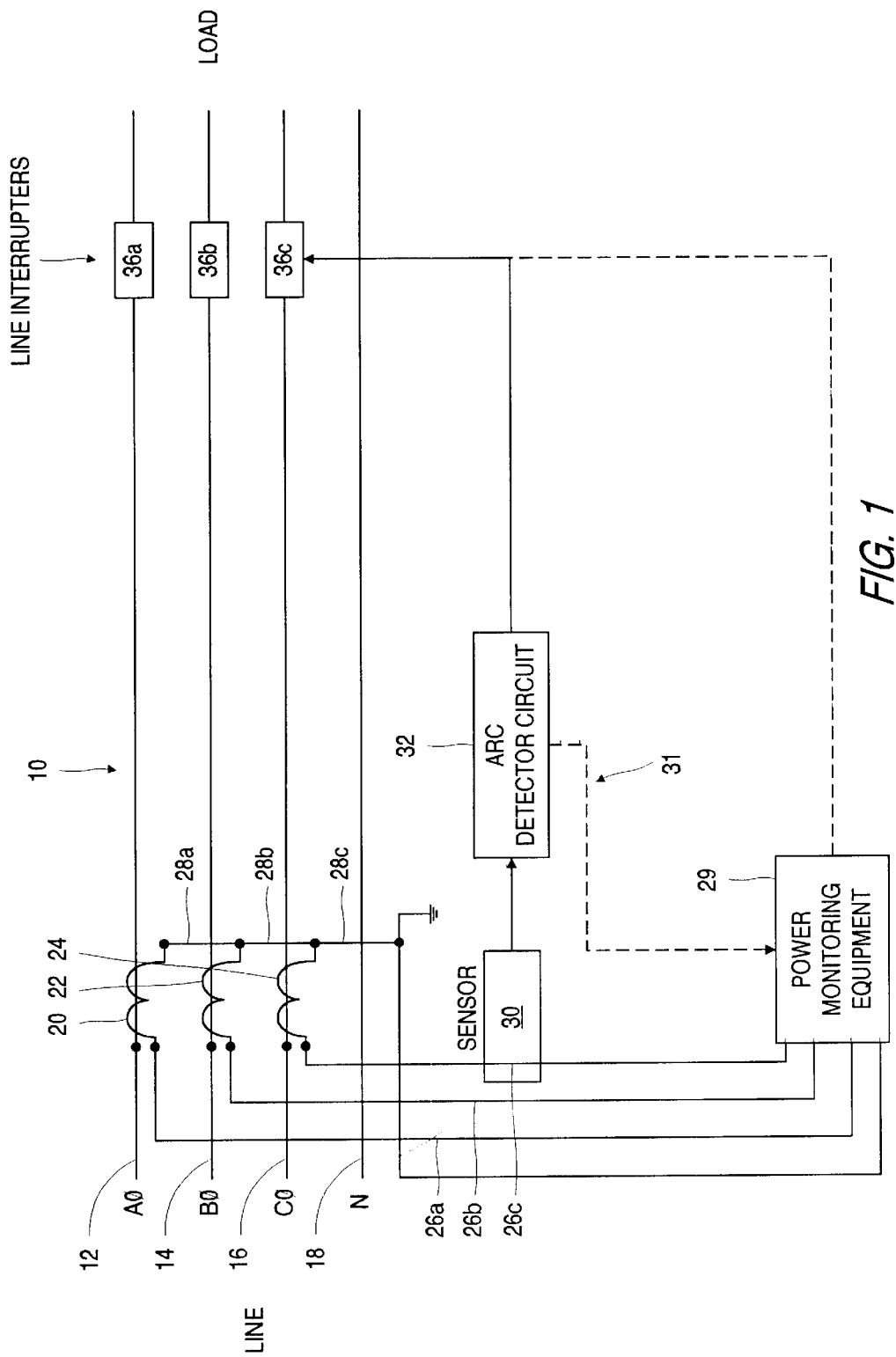
FIG. 1 is a block diagram of an arcing fault detection system connected to secondary lines of a current transformer according to principles of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is shown a three phase, four wire electrical distribution system 10 adapted to distribute electrical power from a utility company power source (not shown) to various loads (not shown).

Reference numerals 12, 14 and 16 designate three respective phase lines and reference numeral 18 designates a neutral line of the electrical distribution system 10. In industrial applications, each of the phase lines generally comprises a large bus bar which may be about eight inches in width and carry a current from 50 amps up to approximately 6,000 amps. Current transformers (CTs) 20, 22 and 24 having their primary windings connected to the respective phase lines 12, 14 and 16 are provided to step down the current to 5 amps on secondary lines 26a, 26b and 26c. Secondary lines 26a, 26b and 26c typically comprise #16 AWG electrical wires.

Power monitoring equipment 29 may be provided to monitor the electrical distribution system 10 via one or more of the secondary lines 26a, 26b and 26c. A sensor 30 is coupled to the secondary line 26c and is adapted to monitor the rate-of-change of electrical current flowing through the secondary line 26c and produce a signal representing the rate of change. The sensor 30 may be coupled to any one of the secondary lines 26a, 26b or 26c. Alternatively, second and third sensors may be provided to monitor any two or all three of the secondary lines 26a, 26b or 26c. In using sensor(s) connected to the relatively small secondary lines of a current transformer rather than to the large bus bars used in industrial applications, the sensor 30 is much smaller than prior art systems and may be installed more easily and much less expensively than prior art systems.

The sizes and current ratings heretofore described are intended to reflect those found in a typical industrial system, but it will be appreciated that the values heretofore described are exemplary only. Moreover, the present invention is not limited to three-phase, four-wire systems, but may be used with single-phase, three-wire systems or any other electrical power distribution system known in the art. Although the present invention is particularly adapted for industrial systems, it will be appreciated that the present invention may also be used in residential or commercial systems having a current transformer connected to the phase or line buses.

The rate-of-change signal from the sensor 30 is supplied to an arcing fault detector circuit 32, which produces a pulse each time the rate-of-change signal increases above a selected threshold. The rate-of-change signal and/or the pulses produced therefrom are filtered to eliminate signals or pulses outside a selected frequency range. The final pulses are then monitored to detect when the number of pulses that occur within a selected time interval exceeds a predetermined threshold. In the event that the threshold is exceeded, the arc detector circuit 32 energizes a trip solenoid (not shown) which triggers the appropriate line interrupter 36a, 36b or 36c to interrupt the current flowing in the respective line conductor 12, 14 or 16.

In an alternative embodiment, the power monitoring equipment 29 is capable of independently energizing a trip solenoid which triggers the line interrupters 36a, 36b or 36c. In this case, if the arcing fault detector circuitry 32 determines that an arcing fault has occurred, it may indirectly trigger the line interrupter 36 by sending a signal 31 to the power monitoring equipment rather than directly to the line interrupters.

Each of the line interrupters 36 is preferably a circuit breaker which includes an overload trip mechanism having a thermal/magnetic characteristic which trips the breaker contacts to an open circuit condition in response to a given overload condition, to disconnect the corresponding load from the power source, as is known in the art.

The line interrupters may also be equipped with ground fault interrupter circuitry responding to a line or neutral-to-ground fault to energize a trip solenoid which trips the circuit breaker and interrupt the current in line conductor 12, 14 or 16.

In one embodiment of the present invention, the sensor 30 is a toroidal sensor having an annular core encompassing the current-carrying load line, with the sensing coil wound helically on the core. The core is made of magnetic material such as a ferrite, iron, or molded permeable powder capable of responding to rapid changes in flux. A preferred sensor uses a ferrite core wound with 200 turns of 24–36 gauge copper wire to form the sensing coil. An air gap may be cut into the core to reduce the permeability to about 30. The core material preferably does not saturate during the relatively high currents produced by parallel arcs, so that arc detection is still possible at those high current levels.

Other means for sensing the rate of change of the current in the secondary line are contemplated by the present invention. By Faraday's Law, any coil produces a voltage proportional to the rate of change in magnetic flux passing through the coil. The current associated with an arcing fault generates a magnetic flux around the conductor, and the coil of the sensor 30 intersects this flux to produce a signal. Other suitable sensors include a toroidal transformer with a core of magnetic material or an air core, an inductor or a transformer with a laminated core of magnetic material, and inductors mounted on printed circuit boards. Various configurations for the sensor core are contemplated by the present invention and include toroids which have air gaps in their bodies.

Preferably, the rate-of-change signal produced by the sensor 30 represents only fluctuations in the rate of change within a selected frequency band. The sensor bandpass characteristic is preferably such that the lower frequency cut-off point rejects the power frequency signals, while the upper frequency cut-off point rejects the high frequency signals generated by noisy loads such as a solder gun, electric saw, electric drill, or like appliances, equipment, or tools. The resulting output of the sensor 30 is thus limited to the selected frequency band associated with arcing faults, thereby eliminating or reducing spurious fluctuations in the rate-of-change signal which could result in nuisance tripping. As an example, the sensor bandpass characteristic may have: (1) a lower frequency cut-off point or lower limit of 60 Hz so as to reject power frequency signals, and (2) an upper frequency cut-off point or upper limit of approximately 1

MHz so as to effectively reject high frequency signals associated with noisy loads. These specific frequency cut-off points for the sensor bandpass characteristic are by way of example only, and other appropriate frequency cut-off limits may be adopted depending upon actual frequency ranges for the power signals as well as the noisy load signals.

The desired bandpass characteristic is realized by appropriately selecting and adjusting the self-resonant frequency of the sensor. The current-type sensor is selected to have a predetermined self-resonant frequency which defines associated upper and lower frequency cut-off or roll-off points for the operational characteristics of the sensor. Preferably, the current-type sensor is designed to exhibit the desired bandpass filtering characteristic as it operates to detect the rate of change of current variations within the load line being monitored. The present invention contemplates other means for bandpass filtering the signal output within the selected frequency band. For example, a bandpass filter or a combination of filters in a circuit can be used to attenuate frequencies above or below the cut-off points for the selected frequency band.

Figure 2:
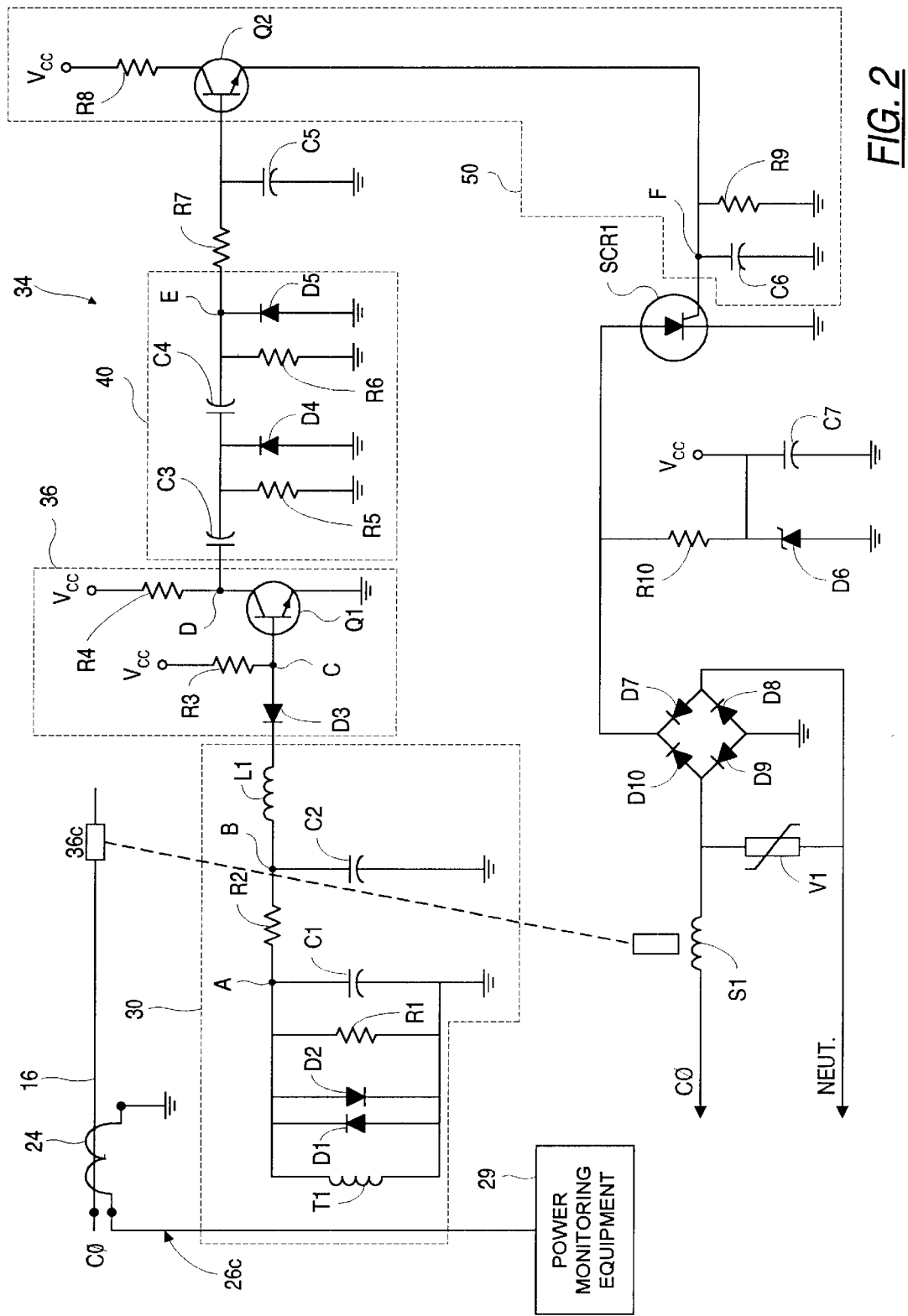
FIG. 2 is a schematic diagram of an electrical circuit for implementing the arcing fault detection system illustrated in FIG. 1.

A preferred circuit for the arcing fault detection system according to the present invention is shown in FIG. 2. The sensor 30 comprises a sensor coil T1 which is wound on a core surrounding the secondary line 26c. Connected in parallel with the sensor coil T1 are a pair of diodes D1 and D2 which serve as clamping devices during high-power transient conditions. A resistor R1 in parallel with the diodes D1 and D2 dampens self-ringing of the sensor, during high-power transients. A pair of capacitors C1 and C2 in parallel with the resistor R1, and a resistor R2 and an inductor L1 connected in series to the input to a comparator 36, are tuned to assist in attaining the desired rolloff characteristics of the filtering network formed thereby. For example, with the illustrative values listed below for the components of the circuit of FIG. 2, the sensor has a passband extending from about 10 KHz to about 100 KHz, with sharp rolloff at both sides of the passband.

Figure 3A:
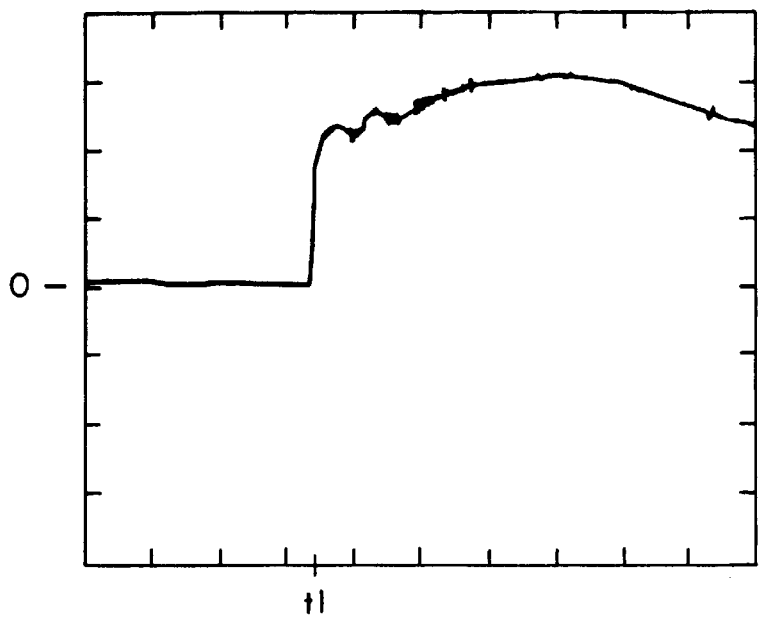
FIG. 3a through 3g are waveforms at various points in the circuit of FIG. 2.
Figure 3B:
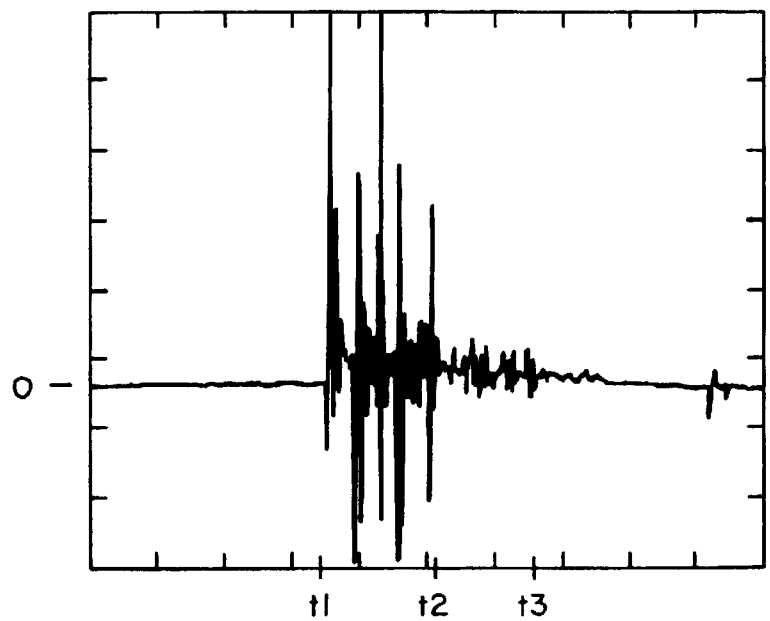

The operation of the circuit of FIG. 2 can be more clearly understood by reference to the series of waveforms in FIG. 3a through 3g. FIG. 3a represents the waveform on a secondary wire 26 at a frequency of 60 Hz and experiencing a high-frequency disturbance beginning at time t1. Because the high-frequency disturbance is within the frequency range to which the sensor 30 is sensitive (e.g., from about 10 KHz to about 100 KHz), the disturbance results in a burst of high-frequency noise in the di/dt output signal (FIG. 3b) from the sensor 30 (at point A in the circuit of FIG. 2), beginning at time t1. The noise burst has a relatively high amplitude from time t1 until approximately time t2, and then continues at a low amplitude from time t2 to about time t3.

The magnitude of the rate-of-change signal from the sensor 30 is compared with the magnitude of a fixed reference signal in a comparator 36, which produces an output voltage only when the magnitude of the rate-of-change signal crosses that of the reference signal. This causes the detector to ignore low-level signals generated by the sensor 30. All signals having a magnitude above the threshold level set by the magnitude of the reference signal are amplified to a preset maximum value to reduce the effect of a large signal. In the comparator 36, a transistor Q1 is normally turned on with its base pulled high by a resistor R3. A diode D3 changes the threshold and allows only the negative pulses from the sensor 30 to be delivered to the base of transistor Q1. When the signal to the comparator drops below the threshold level (minus 0.2 volt for the circuit values listed below), this causes the transistor Q1 to turn off. This causes the collector of the transistor Q1 to rise to a predetermined voltage, determined by the supply voltage $V_{cc}$, a resistor R4 and the input impedance of a single-shot pulse generator circuit 40. This collector voltage is the output of the comparator circuit 36. The collector voltage remains high as long as the transistor Q1 is turned off, which continues until the signal from the sensor 30 rises above the threshold level again. The transistor Q1 then turns on again, causing the collector voltage to drop. The end result is a pulse output from the comparator, with the width of the pulse corresponding to the time interval during which the transistor Q1 is turned off, which in turn corresponds to the time interval during which the negative-going signal from the sensor 30 remains below the threshold level of the comparator.

Figure 3C:
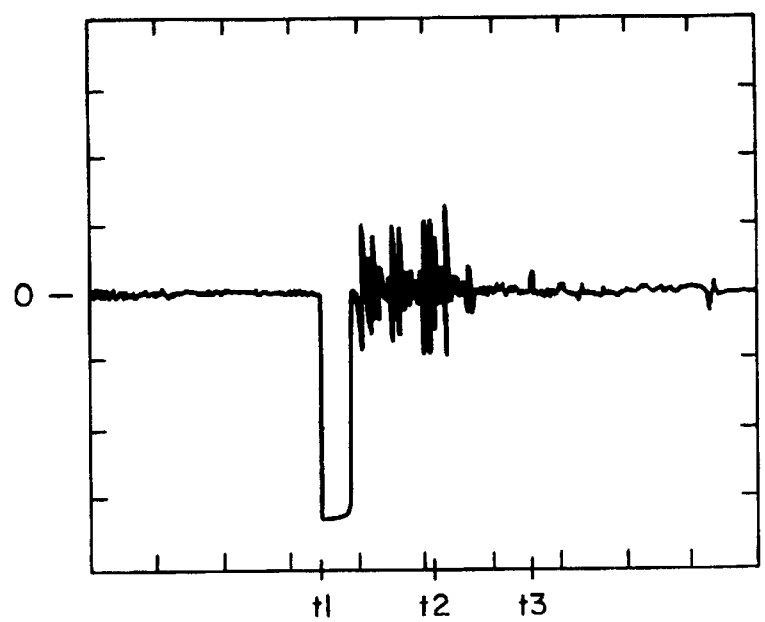
Figure 3D:
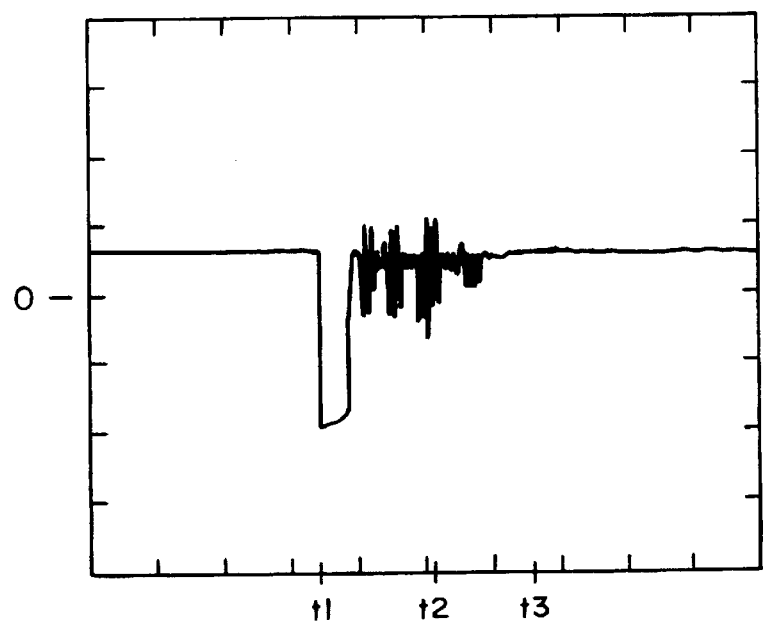

The noise burst in the sensor output is filtered to produce the waveform shown in FIG. 3c at point B in the circuit of FIG. 2. The waveform at point C in the circuit of FIG. 2 is shown in FIG. 3d, and it can be seen that the amplitude has been reduced and a d-c. offset has been introduced by summing the filtered di/dt signal with a d-c. bias from the supply voltage $V_{cc}$ at point C. This is the input signal to the base of the transistor Q1.

Figure 3E:
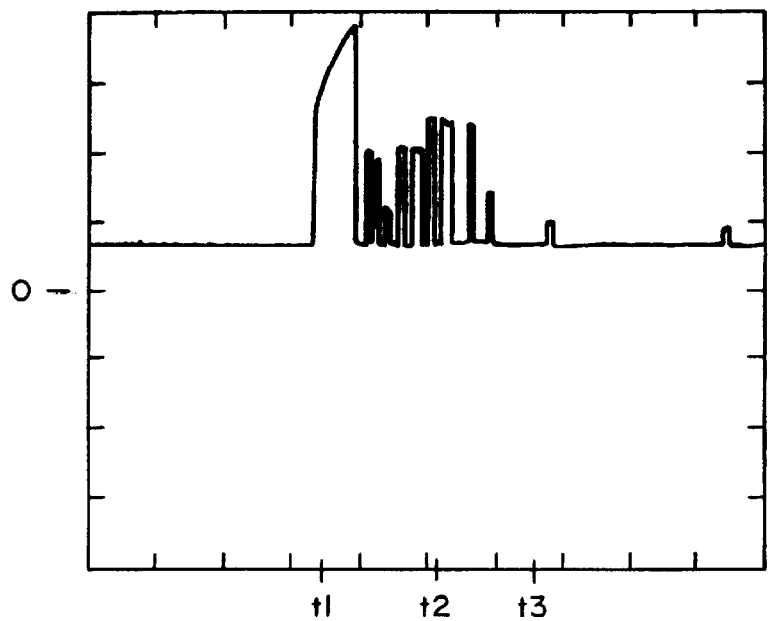

The output of the transistor Q1 is a series of positive-going pulses corresponding to the negative-going peaks in the input signal. The transistor output, at point D in the circuit of FIG. 2, is shown in FIG. 3e. It can be seen that the transistor circuit functions as a comparator by producing output pulses corresponding only to negative-going peaks that exceed a certain threshold in the filtered di/dt signal shown in FIG. 3c. At this point in the circuit, the pulses vary in both width and amplitude, as can be seen in FIG. 3e.

To convert the output pulses of the comparator 36, which vary in both width and amplitude, into a series of pulses of substantially constant width and amplitude, the comparator output is fed to a single-shot pulse generator circuit 40. This high-pass filter circuit includes a pair of capacitors C3 and C4 connected in series to the collector of the transistor Q1, and two resistor-diode pairs connected in parallel from opposite sides of the capacitor C4 to ground. The pulses produced by this circuit will be described in more detail below in connection with the waveforms shown in FIG. 3. The output pulses are predominantly pulses of equal width and amplitude, although occasional larger or smaller pulses can result from especially large or small input pulses.

Figure 3F:
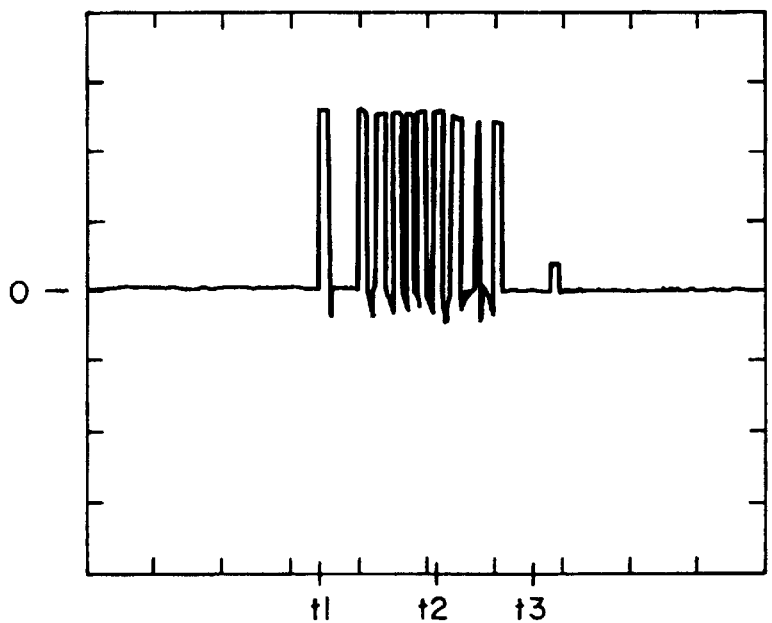

The variable-width and variable-amplitude pulses of FIG. 3e are converted to a series of pulses of substantially constant width and amplitude by the single-shot pulse generator circuit 40. The output of this circuit 40, at point E in the circuit of FIG. 2, is shown in FIG. 3f. Although all the pulses shown in FIG. 3f are of substantially the same size, larger or smaller pulses may be produced by di/dt spikes that are excessively large or excessively small. The vast majority of the pulses at point E, however, are substantially independent of the amplitude and duration of the corresponding spikes in the di/dt signal, provided the spikes are large enough to produce an output pulse from the comparator 30.

The substantially uniform pulses produced by the circuit 40 are supplied to the base of a transistor Q2 through a current-limiting resistor R7. A capacitor C5 connected from the transistor base to ground improves the sharpness of the roll-off of the bandpass filtering. The transistor Q2 is the beginning of an integrator circuit 50 that integrates the pulses produced by the circuit 40. The pulses turn the transistor on and off to charge and discharge a capacitor C6 connected between the transistor emitter and ground. A resistor R9 is connected in parallel with the capacitor C6, and a resistor R8 connected between the supply voltage and the collector of the transistor Q2 determines the level of the charging current for the capacitor C6. The magnitude of the charge on the capacitor C6 at any given instant represents the integral of the pulses received over a selected time interval. Because the pulses are substantially uniform in width and amplitude, the magnitude of the integral at any given instant is primarily a function of the number of pulses received within the selected time interval immediately preceding that instant.

Consequently, the value of the integral can be used to determine whether an arcing fault has occurred.

Figure 3G:
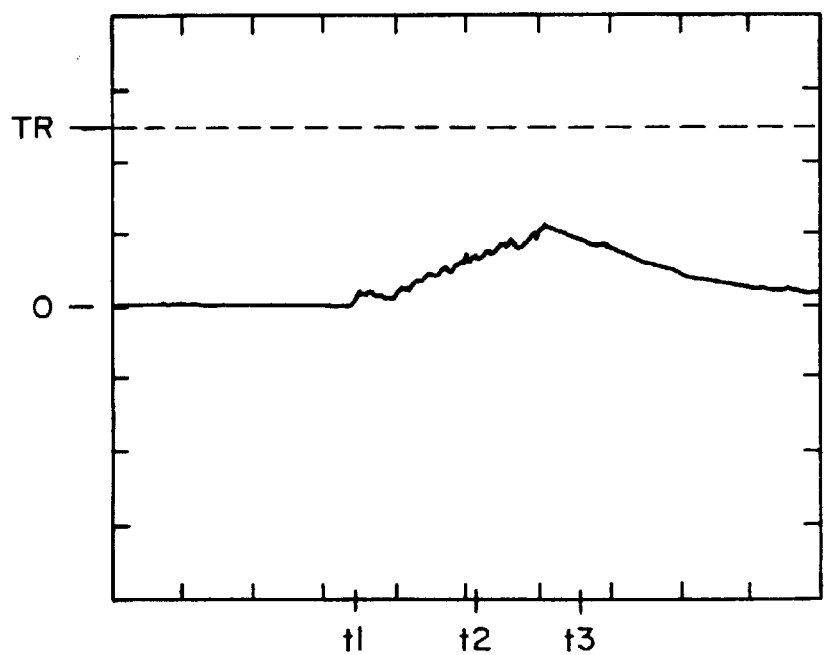

The integral signal produced by the circuit 50 is shown in FIG. 3g, taken at point F in the circuit of FIG. 2. It can be seen that the integrator circuit charges each time it receives a pulse from the circuit 40, and then immediately begins to discharge. The charge accumulates only when the pulses appear at a rate sufficiently high that the charge produced by one pulse is less than the discharge that occurs before the next pulse arrives.

If the pulses arrive in sufficient number and at a sufficient rate to increase the integral signal to a trip threshold level TR (FIG. 3g), SCR1 is triggered to trip the circuit breaker. The circuit is designed so that this occurs only response to a di/dt signal representing an arcing fault.

When SCR1 is turned on, a trip solenoid S1 is energized to disconnect the load from the circuit in the usual manner. Specifically, turning on SCR1 causes current to flow from line to neutral through a diode bridge formed by diodes D7–D10, thereby energizing the solenoid to open the circuit breaker contacts in the line 16 and thereby disconnect the protected portion of the system from the power source. The d-c. terminals of the diode bridge are connected across SCR1, and the voltage level is set by a zener diode D6 in series with a current-limiting resistor R10. A varistor V1 is connected across the diode bridge as a transient suppressor. A filtering capacitor C7 is connected across the zener diode D6. The trip circuit loses power when the circuit breaker contacts are opened, but of course the contacts remain open until reset.

One example of a circuit that produces the desired result described above is the circuit of FIG. 2 having the following values:

D1 1N4148
D2 1N 4148
D3 1N 4148
D4 1N 4148
D5 1N 4148
D6 27v zener
R1 3.01K
R2 1.3K
R3 174K
R4 27.4K
R5 10K
R6 10K
R7 10K
R8 4.2K
R9 4.75K
R10 24K
L1 3300uH
L2 500uH
L3 500uH
C1 0.012uF
C2 0.001uF
C3 0.001uF
C4 0.001uF
C5 0.001uF
C6 6.8uF
C7 1.0uF
C8 1.0uF
Q1 2N2222A
Q2 2N2222A
SCR1 CR08AS-12 made by POWEREX-Equal
$V_{cc}$ 27v Although a circuit breaker is the most commonly used line interrupter, the output device may be a comparator, SCR, relay, solenoid, circuit monitor, computer interface, lamp, audible alarm, etc.

It will be understood that a number of modifications may be made in the circuit of FIG. 2. For example, the discrete bandpass filter between the sensor and the comparator can be replaced with an active filter using an operational amplifier. As another example, a single-shot timer can be used in place of the single-shot pulse generator in the circuit of FIG. 2. This circuit can receive the output signal from an active filter as the trigger input to an integrated-circuit timer, with the output of the timer supplied through a resistor to the same integrator circuit formed by the resistor R9 and capacitor C6 in the circuit of FIG. 2.

Figure 4:
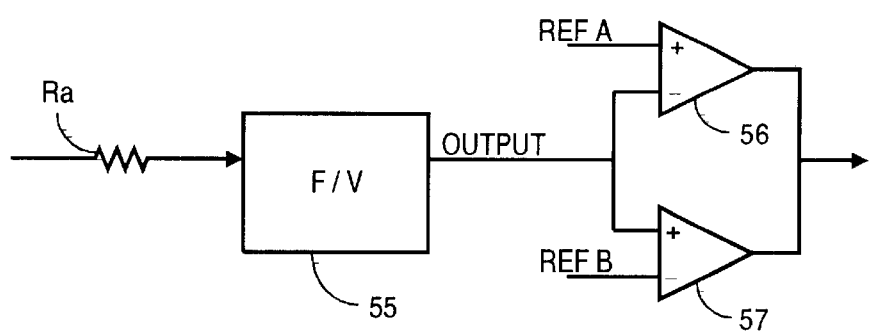
FIG. 4 is a schematic diagram of an alternative circuit for use in place of the comparator and single-shot pulse generator in the circuit of FIG. 2.

FIG. 4 illustrates a frequency-to-voltage converter circuit that can be used in place of all the circuitry between point A and the integrator circuit in FIG. 2. In this circuit, the signal from point A in FIG. 2 is supplied through a resistor Ra to a frequency/voltage converter integrated circuit 55 such as an AD537 made by Analog Devices Inc. The output of the integrated circuit 55 is fed to a pair of comparators 56 and 57 that form a conventional window comparator. Specifically, the output of the circuit 55 is applied to the inverting input of a comparator 56 and to the non-inverting input of a comparator 57. The other inputs of the comparators 56 and 57 receive two different reference signals A and B which set the limits of the window, i.e., the only signals that pass through the window comparator are those that are less than reference A and greater than reference B.

Figure 5:
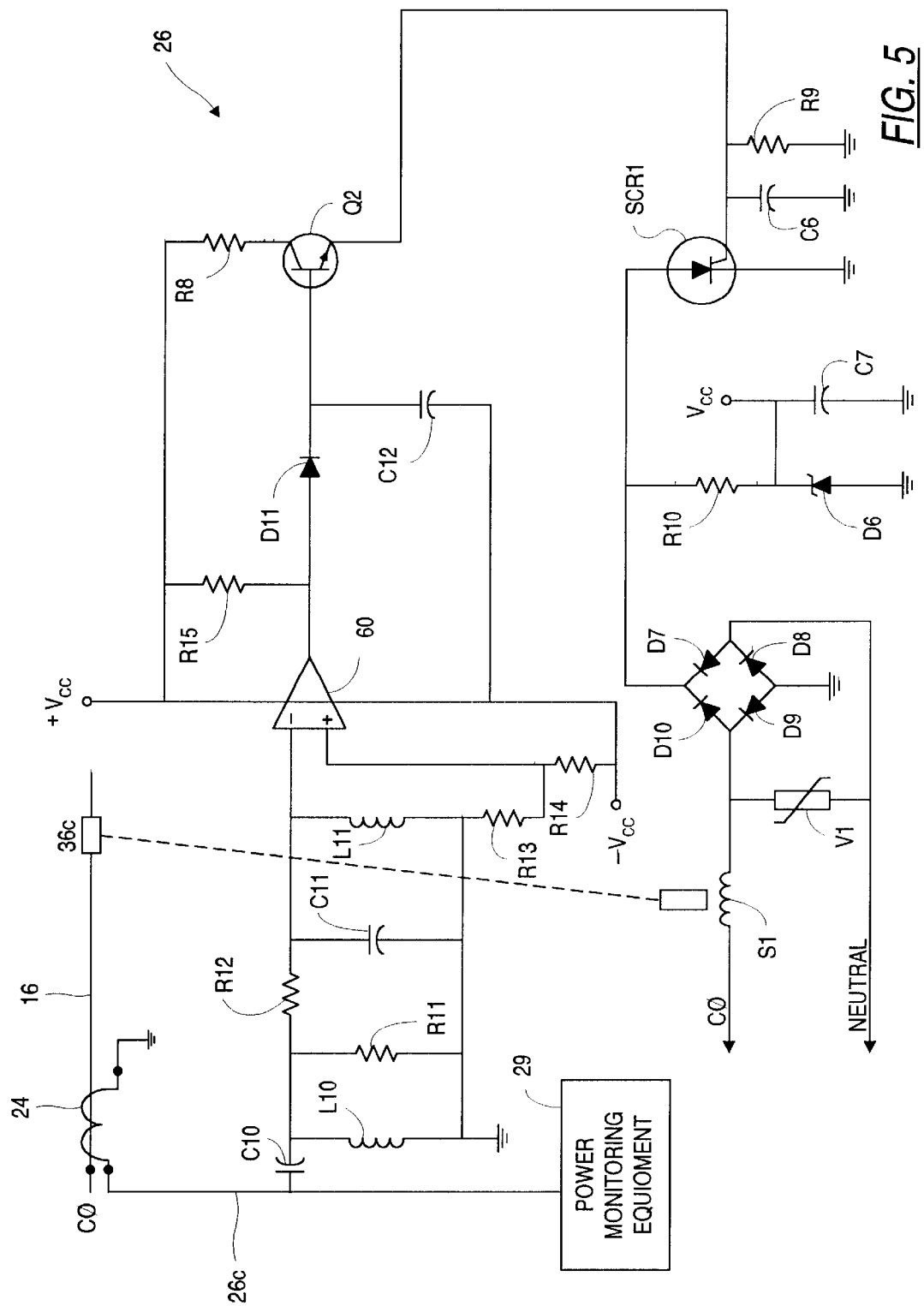
FIG. 5 is a schematic diagram of an alternative circuit for implementing the arcing fault detection system illustrated in FIG. 1.

FIG. 5 illustrates an alternative circuit for the arcing fault detector circuit 32 which senses the rate of change of voltage, i.e., dv/dt, rather than current. The sensor in this circuit is a capacitor C10 connected between the secondary line 26c and an inductor L10 leading to ground. The inductor L10 forms part of a bandpass filter that passes only those signals falling within the desired frequency band, e.g., between 10 KHz and 100 KHz. The filter network also includes a resistor R11, a capacitor C11 and a second inductor L11 in parallel with the first inductor L10, and a resistor R12 connected between the resistor R11 and the capacitor C11. The resistor R11 dampens the ringing between the capacitor C10 and the inductor L10, and the resistor R12 adjusts the threshold or sensitivity of the circuit. The inductors L10 and L11 provide low-frequency roll-off at the upper end of the pass band, and a capacitor C11 provides the high-frequency roll-off at the lower end of the pass band.

The capacitor C10 may be constructed by attaching a dielectric to the secondary wire so that the secondary wire forms one plate of the capacitor. The second plate of the capacitor is attached on the opposite side of the dielectric from the secondary wire. The sensor circuit is connected to the second plate.

The output of the bandpass filter described above is supplied to a comparator 60 to eliminate signals below a selected threshold, and to limit large signals to a preselected maximum amplitude. The filter output is applied to the inverting input of the comparator 60, through the resistor R12, while the non-inverting input receives a reference signal set by a voltage divider formed by a pair of resistors R13 and R14 connected between $V_{cc}$ and ground. The comparator 60 eliminates very low levels of signal received from the sensor. The comparator 60 is normally off when there is no arcing on the line conductor 16, and thus the comparator output is low. When the voltage signal from the sensor is more negative than the reference input (e.g., −0.2 volts), the output from the comparator goes high, and a forward bias is applied to the transistor Q2 that drives the integrator circuit. A capacitor C12 connected from the base of transistor Q2 to $-V_{cc}$ filters out high frequency noise. A diode D11 is connected between the comparator output and the base of the transistor Q2 to block negative signals that would discharge the capacitor C12 prematurely. The rest of the circuit of FIG. 5 is identical to that of FIG. 2.

Figure 6:
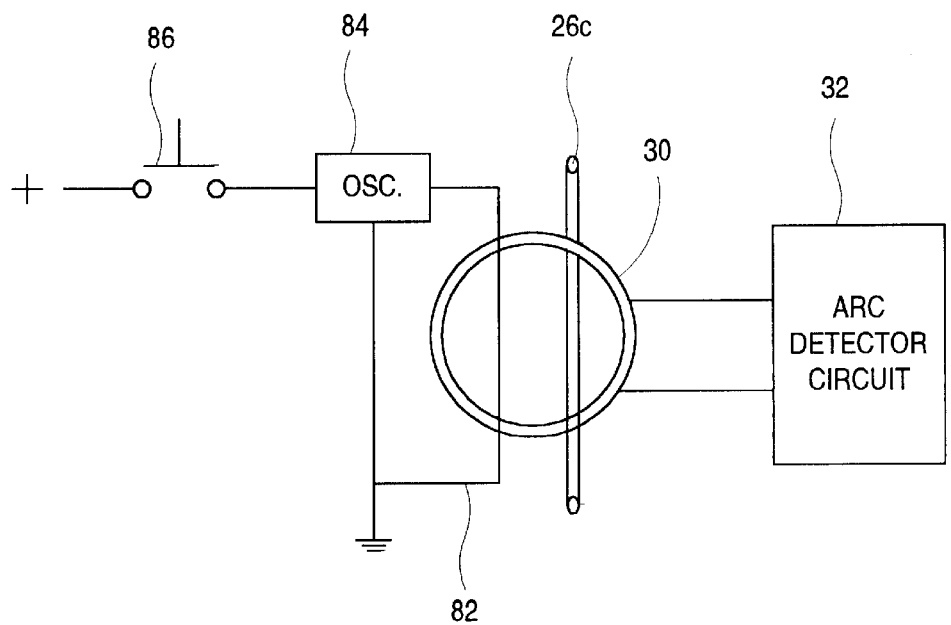
FIG. 6 is a block diagram of a test circuit that may be used in the arcing fault detection system of FIG. 1.

FIG. 6 illustrates a test circuit that may be used in an arcing fault detection system according to principles of the present invention. A test wire 82 passes through the sensor 30 together with the secondary line 26c. As described in relation to FIG. 2 and 5, respectively, the sensor 30 generates an output signal to the arc detector circuit 32 which is responsive to either current (di/dt) or voltage (dv/dt) in the secondary line 26c. The arc detector circuit 32 thereafter generates an arc-indicative signal in response to the sensor signal having characteristics indicative of an arcing fault. In the test circuit, however, the output signal produced by the sensor 30 is responsive to the signal (either di/dt or dv/dt) associated with both the secondary line 26c and the test wire 82.

When a test signal is produced on the test wire 82, the sensor 30 thereby simultaneously monitors the rate-of-change of current or voltage associated with the test wire 82 and the secondary wire 26c, and produces a sensor signal representing the rate-of-change of current or voltage of both the test wire 82 and the secondary wire 26c. An arc-indicative signal is produced by the arc detector circuit 32 if the sensor signal associated with either the test wire 82 or the secondary wire 26c has characteristics indicative of an arcing fault.

In the embodiment shown in FIG. 6, the test signal is produced by a free running oscillator 84 connected to the test wire 82. When turned on, the oscillator 84 produces a signal in the test wire 82 simulating an arcing fault, preferably an alternating current with a frequency of about 10 kHz to 100 kHz. The simulated arcing fault passing through the test wire 82 will be detected by sensor 30, which in turn will send a signal to the arc detector circuit 32. The arc detector circuit 32 will process the signal and generate an arc-indicative signal if the sensor signal has characteristics of an arcing fault.

The oscillator 84 may be manually controlled through operation of push-to-test switch 86. An operator may start the oscillator and introduce a current in the test wire 82 by depressing the push-to-test switch 86, and subsequently stop the oscillator by releasing the push-to-test switch 86. Other means of generating a test signal through test wire 82 are also contemplated by the present invention. Moreover, a self-test or automatic test can be used instead of the manual test described above. For example, the switch can include a timer for automatically starting and stopping the oscillator 84 or alternative type of signal generator.

While the present invention has been described with reference to one or more particular embodiments, those skilled in the art will recognize that many changes may be made thereto without departing from the spirit and scope of the present invention. Such variations are contemplated as falling within the spirit and scope of the claimed invention, as set forth in the following claims.

What is claimed is:

1. A system for detecting arcing faults in an electrical distribution system including a line conductor carrying an electrical current between a power source and a load said system comprising:

a current transformer coupled to said line conductor, said current transformer including at least one secondary line carrying a secondary current less than the electrical current carried on said line conductor, a sensor coupled to one of said secondary lines for monitoring the secondary current to detect the occurrence of an arcing fault signal in said line conductor, said sensor producing a rate-of-change signal representing the rate of change of said secondary current, and means for generating an arcing-fault-detection signal in response to said rate-of-change signal demonstrating characteristics of an arcing fault.

2. The system of claim 1 further comprising means for bandpass filtering said rate-of-change signal within a selected frequency band so that power frequency signals and noisy load signals are rejected.

3. The system of claim 1 wherein said sensor is a toroidal sensor that includes a winding, said system including means for testing the resistance of the winding.

4. The system of claim 1 further comprising a test line coupled to said sensor in the same manner as said secondary line, said test line being adapted to carry a test signal simulating an arcing fault signal; and a signal generator connected to said test line for producing said test signal.

5. The system of claim 4 wherein said test signal is a repetitive oscillating signal.

6. The system of claim 4 wherein said test signal is an alternating signal having a frequency substantially above the frequency of the power source.

7. The system of claim 4 wherein said test signal has a frequency between about 10 KHz and 100 KHz.

8. A method of detecting arcing faults in an electrical distribution system including a line conductor carrying an electrical current between a power source and a load, said method comprising the steps of:

coupling a current transformer to said line conductor, said current transformer including at least one secondary line carrying a secondary current less than the electrical current carried on said line conductor, coupling a sensor to one of said secondary lines, said sensor monitoring the secondary current and producing a rate-of-change signal representing the rate of change of said secondary current, and generating an arcing-fault-detection signal in response to said rate-of-change signal demonstrating characteristics of an arcing fault.

9. The method of claim 8 further comprising the step of bandpass filtering said rate-of-change signal within a selected frequency band so that power frequency signals and noisy load signals are rejected.

10. The method of claim 8 further comprising the step of disconnecting the load from the power source in said line conductor in response to the step of generating an arcing-fault-detection signal.

11. The system of claim 1 wherein the sensor produces a rate-of-change said system further comprises:

means for producing a pulse each time the rate-of-change signal exceeds a selected threshold;

means for counting the number of said pulses occurring within a selected time interval; and means for generating a trip signal in response to the number of said pulses occurring within said selected time interval exceeding a trip threshold level.

* * * * *